United States Patent
Zielke et al.

(10) Patent No.: US 10,071,767 B2
(45) Date of Patent: Sep. 11, 2018

(54) FLOOR STRUCTURE OF A MOTOR VEHICLE

(71) Applicant: Dr. Ing. h.c. F. Porsche Aktiengesellschaft, Stuttgart (DE)

(72) Inventors: Kai Zielke, Bietigheim Bissingen (DE); Dennis Tegelkamp, Benningen am Neckar (DE); Philipp Butz, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 15/075,755

(22) Filed: Mar. 21, 2016

(65) Prior Publication Data

US 2016/0311466 A1 Oct. 27, 2016

(30) Foreign Application Priority Data

Apr. 23, 2015 (DE) .................. 10 2015 106 272

(51) Int. Cl.
| | |
|---|---|
| *B62D 7/04* | (2006.01) |
| *B62D 21/03* | (2006.01) |
| *B62D 21/04* | (2006.01) |
| *B62D 29/00* | (2006.01) |
| *B62D 25/20* | (2006.01) |

(52) U.S. Cl.
CPC ............. *B62D 21/03* (2013.01); *B62D 21/04* (2013.01); *B62D 25/20* (2013.01); *B62D 29/008* (2013.01)

(58) Field of Classification Search
CPC ...... B62D 21/03; B62D 21/04; B62D 21/157; B62D 25/20; B62D 29/008
See application file for complete search history.

(56) References Cited

U.S. PATENT DOCUMENTS

| 6,382,710 B1 * | 5/2002 | Funk .................... | B62D 21/157 296/187.12 |
|---|---|---|---|
| 6,588,832 B2 | 7/2003 | Sakuma | |
| 7,600,807 B2 * | 10/2009 | Bachmann .......... | B62D 21/157 296/187.08 |

(Continued)

FOREIGN PATENT DOCUMENTS

| DE | 196 27 610 | 1/1998 | |
|---|---|---|---|
| DE | 10232843 A1 * | 2/2004 | ............ B62D 21/09 |

(Continued)

OTHER PUBLICATIONS

German Search Report dated Feb. 17, 2016.
Korean Office Action.

*Primary Examiner* — Darrell G Dayoan
*Assistant Examiner* — Paul A Chenevert
(74) *Attorney, Agent, or Firm* — Gerald E. Hespos; Michael J. Porco; Matthew T. Hespos

(57) ABSTRACT

A floor structure (1) of a motor vehicle has a vehicle floor (2). A central tunnel (3) extends in a longitudinal direction of the motor vehicle and is connected to the vehicle floor (2). Two seat crossmembers (4a, 4b) are spaced apart from one another in a transverse direction of the motor vehicle and the central tunnel (3) extends between the seat crossmembers (4a, 4b) in sections. The floor structure (1) has regions of attachment to the central tunnel (3) on both sides of the central tunnel (3) and cast bridges (5a, 5b) are inserted into the floor structure (1) in the regions of attachment to the central tunnel (3).

7 Claims, 1 Drawing Sheet

(56) References Cited

U.S. PATENT DOCUMENTS

| | | | | |
|---|---|---|---|---|
| 8,061,765 B2* | 11/2011 | Bachmann | ............ | B62D 25/20 296/205 |
| 8,079,635 B2* | 12/2011 | DeVor | ................. | B60N 2/4235 296/187.08 |
| 8,794,696 B2* | 8/2014 | Iseki | ..................... | B62D 21/11 296/203.02 |
| 8,973,979 B2* | 3/2015 | Oezkan | ................. | B62D 25/20 296/193.07 |
| 9,108,682 B2* | 8/2015 | Mori | ................... | B62D 21/157 |
| 9,205,878 B2* | 12/2015 | Bechtler | ............. | B62D 29/008 |
| 2008/0007089 A1 | 1/2008 | Bachmann | | |
| 2008/0315629 A1* | 12/2008 | Abe | .................... | B62D 21/157 296/193.07 |
| 2009/0134668 A1 | 5/2009 | Oezkan et al. | | |
| 2009/0278385 A1 | 11/2009 | Mendoza et al. | | |
| 2010/0026046 A1 | 2/2010 | Mendoza et al. | | |
| 2010/0032990 A1 | 2/2010 | Bachmann | | |
| 2011/0272969 A1* | 11/2011 | Mori | ..................... | B62D 21/10 296/193.07 |
| 2012/0212009 A1* | 8/2012 | Ishizono | ............. | B62D 25/025 296/193.07 |
| 2012/0242113 A1* | 9/2012 | Yasuhara | ............... | B62D 21/11 296/193.07 |
| 2015/0251705 A1* | 9/2015 | Mildner | ................. | B62D 25/20 296/187.08 |
| 2016/0039467 A1* | 2/2016 | Takenaka | ............... | B62D 21/15 296/187.08 |
| 2016/0280274 A1* | 9/2016 | Nusier | .................... | B62D 21/03 |
| 2017/0015360 A1* | 1/2017 | Onishi | ................ | B62D 25/2036 |

FOREIGN PATENT DOCUMENTS

| | | | | |
|---|---|---|---|---|
| DE | 10 2007 056 673 | | 5/2009 | |
| DE | 10 2008 036 335 | | 2/2010 | |
| DE | 10 2008 036 337 | | 2/2010 | |
| DE | 10 2008 036 870 | | 2/2010 | |
| EP | 1382515 A2 | * | 1/2004 | ........... B62D 25/082 |
| EP | 1 876 086 | | 1/2008 | |
| FR | 2926278 A1 | * | 7/2009 | ............. B60N 2/4235 |
| WO | WO 2016001509 A1 | * | 1/2016 | ............. B62D 25/20 |
| WO | WO 2016001510 A1 | * | 1/2016 | ........... B62D 21/157 |

\* cited by examiner

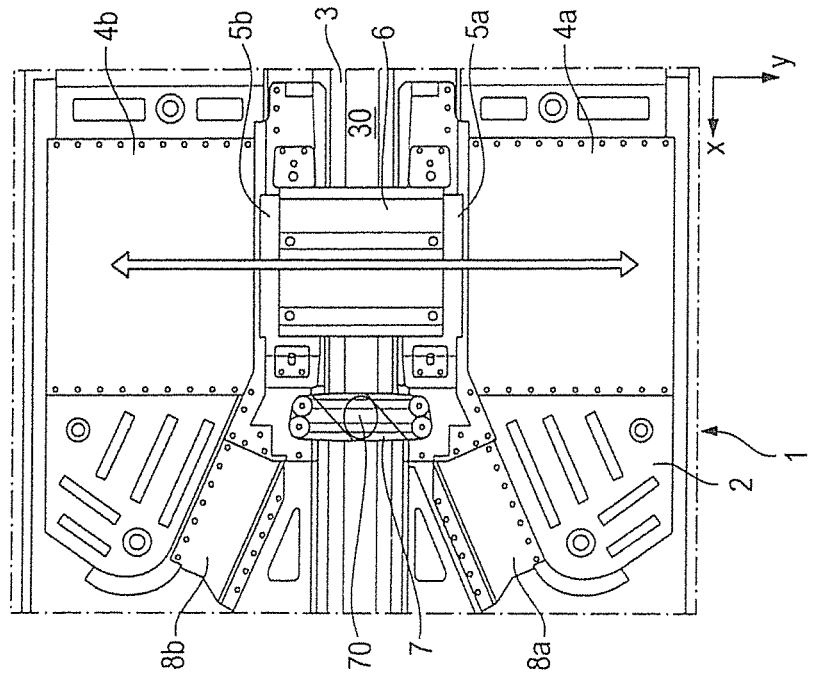
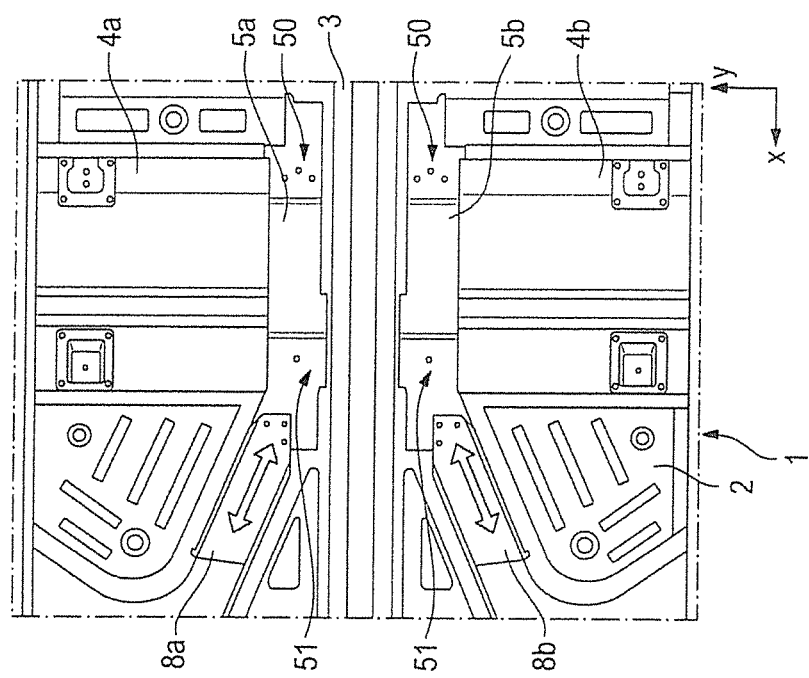

FLOOR STRUCTURE OF A MOTOR VEHICLE

CROSS REFERENCE TO RELATED APPLICATION

This application claims priority under 35 USC 119 to German Patent Appl. No. 10 2015 106 272.0 filed on Apr. 23, 2015, the entire disclosure of which is incorporated herein by reference.

BACKGROUND

1. Field of the Invention

The invention relates to a floor structure of a motor vehicle, comprising a vehicle floor and a central tunnel that extends in a longitudinal direction of the motor vehicle and that is connected to the vehicle floor. Two seat crossmembers are spaced apart from one another in a transverse direction of the motor vehicle and are on opposite sides of the central tunnel.

2. Description of the Related Art

DE 10 2008 036 870 A1 discloses a floor structure of a motor vehicle that has a central tunnel with an open tunnel region facing toward the vehicle floor. The open tunnel region of the central tunnel has profiled closing parts that are spaced apart from one another in the vehicle longitudinal direction and that are arranged between longitudinally running bent portions of the central tunnel. The closing parts may be extruded profiles and function to stiffen the floor structure.

DE 10 2008 036 337 A1 discloses a floor structure of a motor vehicle, having a central tunnel with an open tunnel region. A bridge is arranged in the vehicle transverse direction on an underside of the central tunnel to improve the crash characteristics in the event of a side-on collision.

EP 1 876 086 B1 discloses a floor structure of a motor vehicle with a central tunnel that has an open tunnel region. The floor structure also has two seat crossmembers spaced apart from one another in the vehicle transverse direction. A transverse bridge is attached releasably between the two seat crossmembers to stiffen the tunnel region.

It is the object of the invention to further develop a floor structure of a motor vehicle so that the mechanical characteristics of the regions of attachment to the central tunnel can be adapted in targeted fashion to the expected load situations.

SUMMARY

A floor structure according to the invention has cast bridges inserted into the floor structure in the regions of attachment to the central tunnel. The cast bridges in the regions of attachment to the central tunnel advantageously can be designed in a targeted fashion to different load situations that may arise, for example, in the event of a front-on or side-on collision, and to particular requirements during dynamic driving operation. In this way, it is possible for the crash characteristics of the floor structure to be optimized in targeted fashion.

Two cast bridges may be provided and each may be connected to two seat crossmembers. The seat crossmembers connected to the cast bridges form, in each case, one part of a transverse load path of the floor structure. The design of the cast bridges and the connection of the seat cross members to the cast bridges associated therewith enables the crash characteristics in the event of a side-on collision to be adapted in targeted fashion and optimized. The cast bridges may be connected releasably by screw connections to the seat crossmembers respectively associated therewith. The seat crossmembers to be extruded profiles so that they exhibit high stiffness.

The floor structure may have a tunnel bridge that extends between the two cast bridges across a tunnel region that is open in the direction of the vehicle floor, and the tunnel bridge may be fastened to the cast bridges. The tunnel bridge may be connected releasably by way of screw connections to the cast bridges. The tunnel bridge enables the open tunnel region of the central tunnel to be stiffened additionally in the event of a side-on collision or during dynamic driving operation.

The tunnel bridge may be an extruded profile. In this way, a high level of mechanical stiffness of the tunnel bridge is realized so that the crash characteristics can be optimized further.

Each of the two cast bridges can have a top side with first and second seat rail attachment regions that are spaced apart in a longitudinal direction, a second seat rail attachment regions so that one or more seat rails for a vehicle seat can be fastened thereto. In this way, it is advantageously possible for a direct mechanical attachment of the seat rails to the cast bridges to be realized. The seat rails can be screwed to the cast bridges in the seat rail attachment regions.

A profiled body may be fastened in a front region of each of the two cast bridges, as viewed in the vehicle longitudinal direction. The two profiled bodies may be parts of a longitudinal load path structure of the floor structure. The profiled bodies may be fastened to the cast bridges releasably, in particular by way of screw connections. The attachment of the profiled bodies to the cast bridges serves improves the crash characteristics in the event of a front-on collision of the motor vehicle.

The profiled bodies may be in the form of extruded profiles to realize a high level of mechanical stiffness and may extend obliquely with respect to a longitudinal axis of the cast bridge connected thereto.

The floor structure may have at least one Cardan shaft drive shaft support that extends between the two cast bridges across the central tunnel and that is fastened to the cast bridges. The Cardan shaft support may be in front of the tunnel bridge as viewed in the direction of travel. A releasable fastening of the Cardan shaft support to the two cast bridges may be realized by screw connections.

The cast bridges may be produced from a light metal alloy, such as an aluminum alloy, for a reduction of the total mass of the floor structure.

Further features and advantages of the invention will become clear from the following description of a preferred exemplary embodiment with reference to the accompanying figures.

BRIEF DESCRIPTION OF THE DRAWINGS

FIG. 1 shows a plan view of a floor structure of a motor vehicle in accordance with an embodiment of the invention.

FIG. 2 shows a view of the floor structure of FIG. 1 from below.

DETAILED DESCRIPTION

FIGS. 1 and 2 show a floor structure 1 that is part of a self-supporting bodyshell of a motor vehicle. The floor structure 1 comprises a vehicle floor 2 and a central tunnel 3 in the region of a passenger compartment. The central tunnel 3 extends in a vehicle longitudinal direction x and is connected to the vehicle floor 2. The central tunnel 3 has a U-shaped cross section with a downwardly open tunnel region 30 that is directed toward the vehicle floor 2. Various vehicle components, such as a Cardan shaft, cooling water lines or exhaust lines, may be accommodated in the tunnel region 30. The floor structure 1 has two seat cross members 4a, 4b that are spaced apart from one another in a vehicle transverse direction y and that are extruded profiles for exhibiting a high level of mechanical stiffness. The central tunnel 3 extends, in sections, between the seat crossmembers 4a, 4b.

The floor structure 1 on both sides of the central tunnel 3 has a region of attachment to the central tunnel 3. Each of the two regions of attachment is formed by a respective cast bridge 5a, 5b that is inserted into the floor structure 1. The two cast bridges 5a, 5b are produced from a light metal alloy, such as an aluminum alloy, to keep the total mass of the floor structure 1 as low as possible.

As can be seen in FIG. 2, each of the seat crossmembers 4a, 4b is connected to a respective one of the two cast bridges 5a, 5b. The seat cross members 4a, 4b are connected releasably by screw connection to the cast bridges 5a, 5b associated therewith.

For stiffening of the downwardly open tunnel region 30 in the event of a side-on collision or during dynamic driving operation of the motor vehicle, the floor structure 1 has a tunnel bridge 6 that extends between the two cast bridges 5a, 5b across the open tunnel region 30 and is fastened releasably to the cast bridges 5a, 5b. For a particularly high level of stiffness, the tunnel bridge 6 may be formed as an extruded profile and may be screwed to the cast bridges 5a, 5b. The two seat crossmembers 4a, 4b and the tunnel bridge 6 form a transverse load path that is suitable for accommodating transverse loads that may act on the floor structure 1 of the motor vehicle for example in the event of a side-on collision. It is thus possible, for the forces acting on one of the seat cross members 4a, 4b to at least partially also be transmitted, via the tunnel bridge 6, to the opposite side of the floor structure 1.

A Cardan shaft support 7 may arranged in front of the tunnel bridge 6 as viewed in the vehicle longitudinal direction x. The Cardan shaft support 7 extends between the two cast bridges 5a, 5b across the open tunnel region 30 and preferably is fastened releasably to the cast bridges 5a, 5b. The Cardan shaft support 7 is formed in a central region 70 to bulge out in sections, and may be screwed to the cast bridges 5a, 5b. A Cardan shaft support 7 may be provided for a motor vehicle with all-wheel drive.

As can be seen in FIG. 1, each of the two cast bridges 5a, 5b has, on a top side, a first seat rail attachment region 50 and, spaced apart therefrom in the longitudinal direction, a second seat rail attachment region 51, at which a seat rail (not explicitly illustrated here) for a vehicle seat can be fastened. During the assembly process, the seat rails are screwed to the seat rail attachment regions 50, 51 of the two cast bridges 5a, 5b.

In each case one profiled body 8a, 8b is fastened in a front region of each of the two cast bridges 5a, 5b, obliquely with respect to the longitudinal axis thereof. The two profiled bodies 8a, 8b form in each case one part of a longitudinal load path structure of the floor structure 1 of the motor vehicle, and are preferably in the form of extruded profiles to realize a high level of mechanical stiffness. The two profiled bodies 8a, 8b are designed for accommodating longitudinal loads that may arise, for example, in the event of a front-on collision of the motor vehicle. The profiled bodies 8a, 8b preferably are connected releasably, in particular by screw connection, to the cast bridges 5a, 5b.

The cast bridges 5a, 5b provided, in the case of the floor structure 1 described here, in the regions of attachment to the central tunnel 3 form special connection regions that are provided for a connection of the two seat crossmembers 4a, 4b, of the seat rails, of the tunnel bridge 6, of the profiled bodies 8a, 8b and of the optional Cardan shaft support 7. The two cast bridges 5a, 5b may be adapted, in a targeted manner in terms of construction, to the load situations arising during dynamic driving operation and the load situations arising in the event of a collision of the motor vehicle.

What is claimed is:

1. A floor structure of a motor vehicle, comprising:
a vehicle floor;
a central tunnel having opposite first and second lateral sides extending in a longitudinal direction of the motor vehicle and being connected to the vehicle floor;
first and second cast bridges extending in the longitudinal direction and being inserted into the floor structure on the opposite first and second lateral sides of the central tunnel in a direction normal to the longitudinal direction, the first and second cast bridges being fixed respectively to the opposite first and second lateral sides of the central tunnel;
a tunnel bridge extending across a region of the central tunnel that is open in a direction of the vehicle floor, the tunnel bridge having opposed first and second lateral sides fastened respectively to the first and second cast bridges and having opposite front and rear ends;
first and second seat crossmembers disposed respectively on the opposite first and second lateral sides of the central tunnel, the first and second seat crossmembers being fixed respectively to the first and second cast bridges and extending longitudinally to positions forward and rearward of the front and rear ends of the tunnel bridge; and
first and second profiled bodies spaced from one another on opposite sides of the central tunnel and fastened respectively to the first and second cast bridges, the first and second profiled bodies extending forward from the first and second cast bridges in a direction oblique to the longitudinal direction, wherein the connection of cast bridges with the tunnel bridge and the seat crossmembers stiffen the downwardly open tunnel region in a side-on collision and the connection of the profiled bodies to the cast bridges accommodate longitudinal loads in the event of a front-on collision.

2. The floor structure of claim 1, wherein the seat crossmembers are extruded profiles.

3. The floor structure of claim 1, wherein the tunnel bridge is an extruded profile.

4. The floor structure of claim 1, wherein each of the first and second cast bridges includes a top side with longitudinally spaced first and second seat rail attachment regions configured for fastening to a seat rail for a vehicle seat.

5. The floor structure of claim 1, further comprising at least one Cardan shaft support that extends between the first and second cast bridges across the central tunnel and fastened to the cast bridges.

6. The floor structure of claim 1, wherein the first and second cast bridges are produced from a light metal alloy.

7. The floor structure of claim 1, wherein the first and second cast bridges are produced from an aluminum alloy.

\* \* \* \* \*